(12) United States Patent
Kaizu et al.

(10) Patent No.: US 6,252,826 B1
(45) Date of Patent: Jun. 26, 2001

(54) TIME CONTROL DEVICE

(75) Inventors: Tetsuya Kaizu; Michio Kai, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/141,015

(22) Filed: Aug. 27, 1998

(30) Foreign Application Priority Data

Oct. 20, 1997 (JP) .................................................... 9-287082
Jul. 3, 1998 (JP) .................................................. 10-188812

(51) Int. Cl.⁷ ................................................ G04F 10/00
(52) U.S. Cl. ............................................................ 368/120
(58) Field of Search .................... 368/118–120, 200–202

(56) References Cited

U.S. PATENT DOCUMENTS 4,254,492 * 3/1981 Mcdermott, III ..................... 368/119
4,383,166 * 5/1983 Chu et al. .............................. 368/119
4,392,749 * 7/1983 Clemmons, Jr. ...................... 368/119
4,678,345 * 7/1987 Agoston ................................ 368/119

FOREIGN PATENT DOCUMENTS 58-16319    1/1983  (JP).
2-146855   6/1990  (JP).

OTHER PUBLICATIONS

Kopetz, H and Ochsenreiter, W.: Clock Synchronisation in Distributed Real Time Systems; IEEE Trans. Computers, vol. C–36, No. 8, Aug., 1987, p. 933–940.

* cited by examiner

Primary Examiner—Bernard Roskoski
(74) Attorney, Agent, or Firm—Armstrong, Westerman, Hattori, McLeland, & Naughton, LLP

(57) ABSTRACT

Oscillating precision of the first and the second oscillating sections each having the same oscillation frequency is determined in the oscillating precision determining section according to the timing of a signal supplied from the external time source, and in the internal time stepping control section, stepping control is provided over the internal time using a reference clock oscillated by any of the first and the second oscillating sections according to a result of determination of the oscillation precision.

9 Claims, 10 Drawing Sheets

FIG.3

| DEFECTIVE SECTION | FIRST SAMPLING VALUE (SP1) | SECOND SAMPLING VALUE (SP2) | RESULT OF COMPARISON |
|---|---|---|---|
| EXTERNAL TIME SOURCE | ≠1(sec)±1(μs) | ≠1(sec)±1(μs) | $\|A\| \leq 2(\mu s)$ |
| OSCILLATOR OR EXTERNAL TIME SOURCE | ≠1(sec)±1(μs) | ≠1(sec)±1(μs) | $\|A\| > 2(\mu s)$ |

| ITEM NUMBER | EXPRESSION (2) | EXPRESSION (3) | EXPRESSION (4) | FIRST OSCILLATOR 11 | SECOND OSCILLATOR 12 | CORRECTION ALLOWABLE | EXPECTED DEFECTIVE SECTION |
|---|---|---|---|---|---|---|---|
| 1 | X | X | X | SELECTED | — | NOT ALLOWABLE | ANY TWO OR MORE OF FIRST AND SECOND OSCILLATORs 11, 12 AND EXTERNAL TIME SOURCE |
| 2 | X | O | X | NOT SELCTED | SELECTED | ALLOWABLE | FIRST OSCILLATOR 11 |
| 3 | O | X | X | SELECTED | NOT SELECTED | ALLOWABLE | SECOND OSCILLATOR 12 |
| 4 | X | X | O | SELECTED | — | NOT ALLOWABLE | EXTERNAL TIME SOURCE 30 |
| 5 | X | O | O | NOT SELECTED | SELECTED | ALLOWABLE | FIRST OSCILLATOR 11 |
| 6 | O | X | O | SELECTED | NOT SELECTED | ALLOWABLE | SECOND OSCILLATOR 12 |
| 7 | O | O | O | SELECTED | — | — | — |

FIG.8

| ITEM NUMBER | EXPRESSION (2) | EXPRESSION (3) | EXPRESSION (4) | COMPARISON BETWEEN EXPRESSION (5) AND EXPRESSION (6) | FIRST OSCILLATOR 11 | SECOND OSCILLATOR 12 | CORRECTION ALLOWABLE | EXPECTED DEFECTIVE SECTION |
|---|---|---|---|---|---|---|---|---|
| 7-1 | ○ | ○ | ○ | X<Y | SELECTED | NOT SELECTED | ALLOWABLE | — |
| 7-2 | ○ | ○ | ○ | X=Y | SELECTED | — | ALLOWABLE | — |
| 7-3 | ○ | ○ | ○ | X>Y | NOT SELECTED | SELECTED | ALLOWABLE | — |

TIME CONTROL DEVICE

FIELD OF THE INVENTION

This invention relates to a time control device, and more particularly to a time control device which is applied in a computer system having a timer function such as the TOD (Time-Of-Day Timer) or a real time clock and controls internal time for realizing the timer function.

BACKGROUND OF THE INVENTION

FIG. 10 is a block diagram showing configuration of a time control device based on the conventional technology. A time control device 40 shown in FIG. 10 is connected to an external time source 30, and provides stepping control by receiving time data indicating a reference time and a second pulse (1 second interval) for adjusting timing of such operations as correction (1 second interval). It should be noted that the external time source 30 is a device that transmits a reference time from time reporting service or the like by way of standard electric wave or through a telephone line.

The time control device 40 comprises, as shown in FIG. 10, an oscillator 41 oscillating a reference clock with a fixed frequency, a timer 42 for stepping the internal time, a sampling register 43 for sampling the time counted by the timer 42 according to second pulses received from the external time source 30, a comparing circuit 44 for obtaining an error ($\Delta T$) and advance or delay in stepping by comparing a sampling value obtained by the sampling register 43 to a reference time (time data) value supplied from the external time source 30, and a correcting circuit 45 for doubling a speed of the time count of the timer 42 or stopping the time count based on the error ($\Delta T$) and advance or delay in stepping transmitted from the comparing circuit 44 in order to correct the internal time.

Next, description is made for operations. In the time control device 40 shown in FIG. 10, second pulses oscillated from the external time source 30 and time data are sent to the sampling register 43 and the comparator 44, respectively. The second pulses are periodically transmitted to the sampling register 43 at an interval of 1 second. For this reason, time data of the timer 42 is sampled at an interval of 1 second in the sampling register 43.

In the comparing circuit 44, time data oscillated from the external time source 30 and time data sampled by the sampling register 43 are fetched, and the two time datas are compared to each other. Time obtained by the timer 42 is subtracted from the reference time provided by the external time source 30, and if the error ($\Delta T$) as a result of comparison is plus, it is determined that the time in the timer 42 is delayed from the reference time, and if the error is minus, it is determined that the time in the timer 42 is advancing from the reference time.

As described above, the error ($\Delta T$) or information on advance or delay obtained by the comparing circuit 44 is supplied to the correcting circuit 45. In the correcting circuit 45, when it is determined that the time in the timer 42 is advancing, stop control is provided so that the timer 42 is delayed by the error ($\Delta T$), and when it is determined that the time in the timer 42 is delayed, double speed control is provided so that the timer 42 is advanced by the error ($\Delta T$). Herein the stop control is defined as a control for stopping counting of the reference clock oscillated by the oscillator 41, and the double speed control is defined as control for counting the reference clock oscillated by the oscillator 41 at a higher speed.

As described above, the timer 42 is controlled by executing the double speed control or stop control so that the timer 42 steps at the same time as the reference time supplied from the external time source 30.

As a technology analogous to the time control described above, there is the technology disclosed in, for instance, Japanese Patent Laid-Open Publication No. SHO 58-16319. Disclosed in this patent publication is a technology for sending an external clock from an upper computer to a lower computer to adjust the time of the lower computer.

In the time control device based on the conventional technology as described above, when any trouble occurs in the oscillator that operates the timer, stepping under time control may become inaccurate or may stop, and time can not be provided with high precision. Especially, when the oscillator occurs, stepping control over time can not provided, so that the entire system is affected.

Also, in the system, control over the internal time is provided according to the time supplied from an external time source, so that, when the external time source goes wrong, the failure can not be detected, and time correction is executed following an incorrect time supplied from the external time source. In this case, the entire system operates according to a wrong time, which may affect the operations of the entire system.

Also, when any trouble exceeding the precision of the external time source or the internal oscillator occurs, an error in stepping of the time becomes unnecessarily larger, and a correction rate in the correcting circuit also becomes larger. For this reason, satisfactory precision in correction can not be realized by the correcting circuit, or correction itself become impossible, or an extremely long time is required for correction, which makes it possible to realize real time correction.

As described above, when a trouble occurs in the external time source or the oscillator and the trouble is out of the controllable precision range, the cause can not be clarified and the entire system is affected, so that precision or reliability of the internal time becomes disadvantageously lower.

SUMMARY OF THE INVENTION

It is an object of the invention to provide a time control device which can accurately and quickly shoot troubles in an external time source or in an oscillator for keeping high precision and high reliability of the internal time.

With the present invention, oscillating precision of a first and second oscillators each having the same oscillation frequency is determined according to the timing of a signal supplied from an external time source, and a reference clock oscillated by any one of the first and the second oscillator is used according to a result of determination for providing stepping control over the internal time, so that stepping control can be provided over the internal time by using a correct reference clock, whereby it is possible to keep high precision and high reliability of the internal time.

With the present invention, oscillating precision of each of the first and the second oscillator each having the same oscillation frequency is determined according to the timing of a signal supplied from an external time source, and when it is determined that oscillating precision of both of the oscillators is incorrect, correction of stepping of internal time according to the external time source is stopped, so that incorrect stepping correction can be prevented, whereby it is possible to keep high precision and high reliability of the internal time.

With the present invention, sampling values for a certain period of time are obtained from the reference clocks of the first and the second oscillators each having the same frequency according to pulses from an external time source, and stepping control over the internal time is provided by using the reference clocks of the oscillator having a correct oscillating precision determined through comparison of the sampling values to the expected values for the certain period of times, so that, so long as either one of the reference clocks is correct, stepping control can be provided over the internal time using that reference clock, whereby it is possible to keep high precision and high reliability of the internal time.

With the present invention, when it is determined that oscillating precision of both of the first and the second oscillators is incorrect, an alarm indicating defectiveness of the first and the second oscillators as well as of the external time source is generated, so that a defective section relating to time stepping is alerted to a user early, whereby it is possible to prevent unexpected failure which might occur due to continued use of the internal time even after occurrence of the failure.

With the present invention, when it is determined that oscillating frequency of both the first and the second oscillators is incorrect, an alarm indicating defectiveness of the first and the second oscillators as well as of the external time source is generated, and also correction of the internal time is not performed, so that a defective section relating to time stepping is alerted to a user early, and at the same time the time stepping function is automatically stopped, whereby it is possible to make a function for preventing an unexpected failure automatically operate without requiring any intervention by an operator.

With the present invention, when it is determined that oscillating precision of both the first and the second oscillators is correct, the oscillator having a smaller error is selected as an oscillating unit to be used, so that high precision oscillation can be maintained without being troubled by failure in internal oscillation, whereby it is possible to provide more precise internal time.

With the present invention, when a difference between time in a time counter and that in a dummy counter is larger than a specified value, an alarm indicating that the stepping control unit is defective is generated, so that a defective section relating to time correction is reported early to an user, whereby it is possible to prevent unexpected failure which might occur due to continued use of the internal time even after occurrence of the failure.

With the present invention, when an alarm indicating that the stepping control unit is defective is generated, correction of internal time by stepping control unit is stopped simultaneously, so that a defective section relating to time correction is reported early to an user, and at the same time the time correcting function is automatically stopped, whereby it is possible to prevent unexpected failure which might occur due to continued use of the internal time even after occurrence of the failure.

Other objects and features of this invention will become clear from the following description with reference to the accompanying drawings.

BRIEF DESCRIPTION OF THE DRAWINGS

FIG. 3 is an explanatory view illustrating a method of determining a defective section in Embodiment 1;

FIG. 6 is an explanatory view for illustrating a clock switching method in Embodiment 1;

FIG. 8 is a view for illustrating a clock switching method in Embodiment 2;

DESCRIPTION OF THE PREFERRED EMBODIMENTS

Detailed description is made for preferred embodiments of the time control device according to the present invention with reference to the attached drawings.

Figure 1:
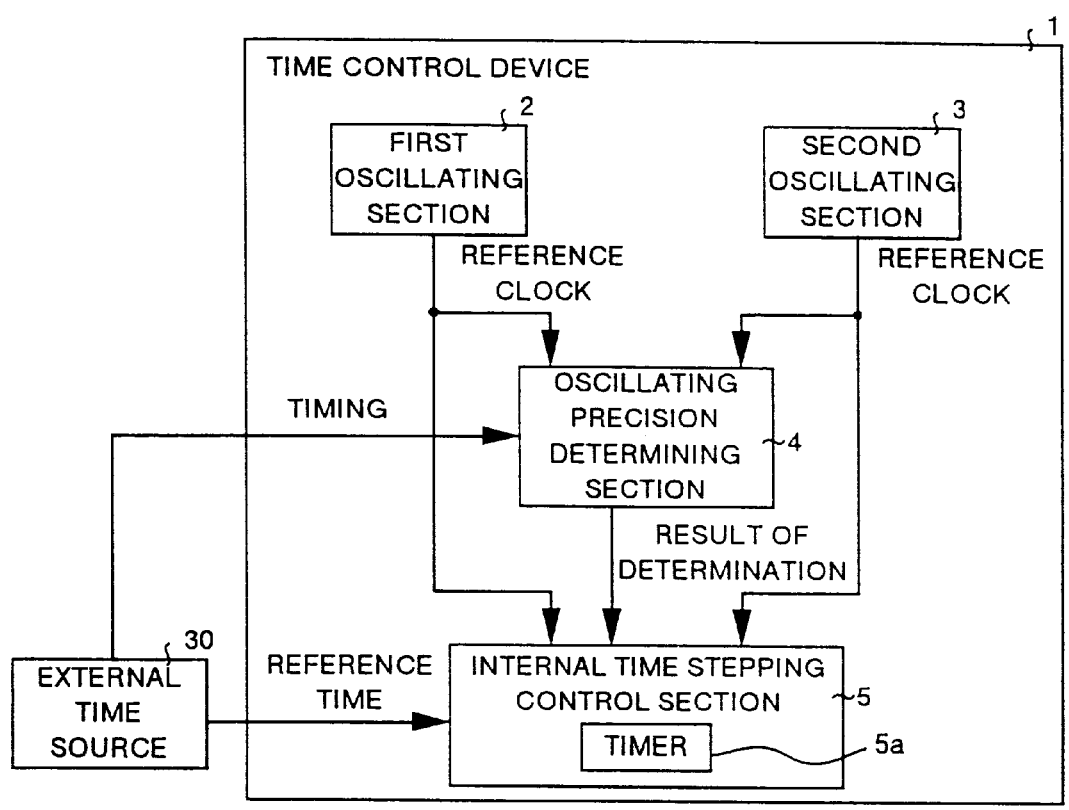
FIG. 1 is a functional block diagram showing principles of a time control device according to the present invention.

At first, description is made for the principles. FIG. 1 is a functional block diagram showing principles of the time control device according to the present invention. Time control device shown in FIG. 1 is connected to the external time source 30 described above, and receives time data indicating a reference time and second pulses (1 second interval) for adjusting timing for correction from the external time source 30 to provide stepping control.

As shown in FIG. 1, this time control device 1 comprises a first oscillating section 2, a second oscillating section 3, a oscillating precision determining section 4, and an internal time stepping control section 5. The first oscillating section 2 oscillates a reference clock at a constant frequency, while the second oscillating section 3 has the same oscillation frequency and precision as that of the first oscillating section 2, and oscillates a reference clock at the same oscillation frequency.

The oscillating precision determining section 4 compares the reference clock oscillated by the first oscillating section 2 to that oscillated by the second oscillating section 3 according to a timing signal transmitted from the external time source 30 to determine oscillating precision of each oscillating sections. The internal time stepping control section 5 has a timer 5a for counting internal time, employs the reference clock of any one of the first oscillating section 2 or the second oscillating section 3 according to a result of determination by the oscillating precision determining section 4, and corrects internal time of the timer 5a according to the reference time supplied from the external time source 30.

With the configuration described above, the oscillating precision determining section 4 determines oscillating precision of the two reference clocks oscillated by the first and the second oscillating sections 2, 3 according to timing of a signal supplied from the external time source 30. As a result, in the internal time stepping control section 5, either the reference clock oscillated by the first or the second oscillating sections 2, 3 is employed according to the oscillating precision determined by the oscillating precision determining section 4. Further, in the internal time stepping control section 5, reference time of the external time source 30 and that in the timer 5a are compared to each other, and when any error is recognized, internal time of the timer 5a is adjusted so that the internal time of the timer 5a matches the reference time supplied from the external time source 30.

Thus stepping of the internal time can be controlled according to a correct reference clock employed from a plurality of reference clocks, and also the internal time can be corrected by referring to time supplied from the external time source 30 as a reference.

Figure 2:
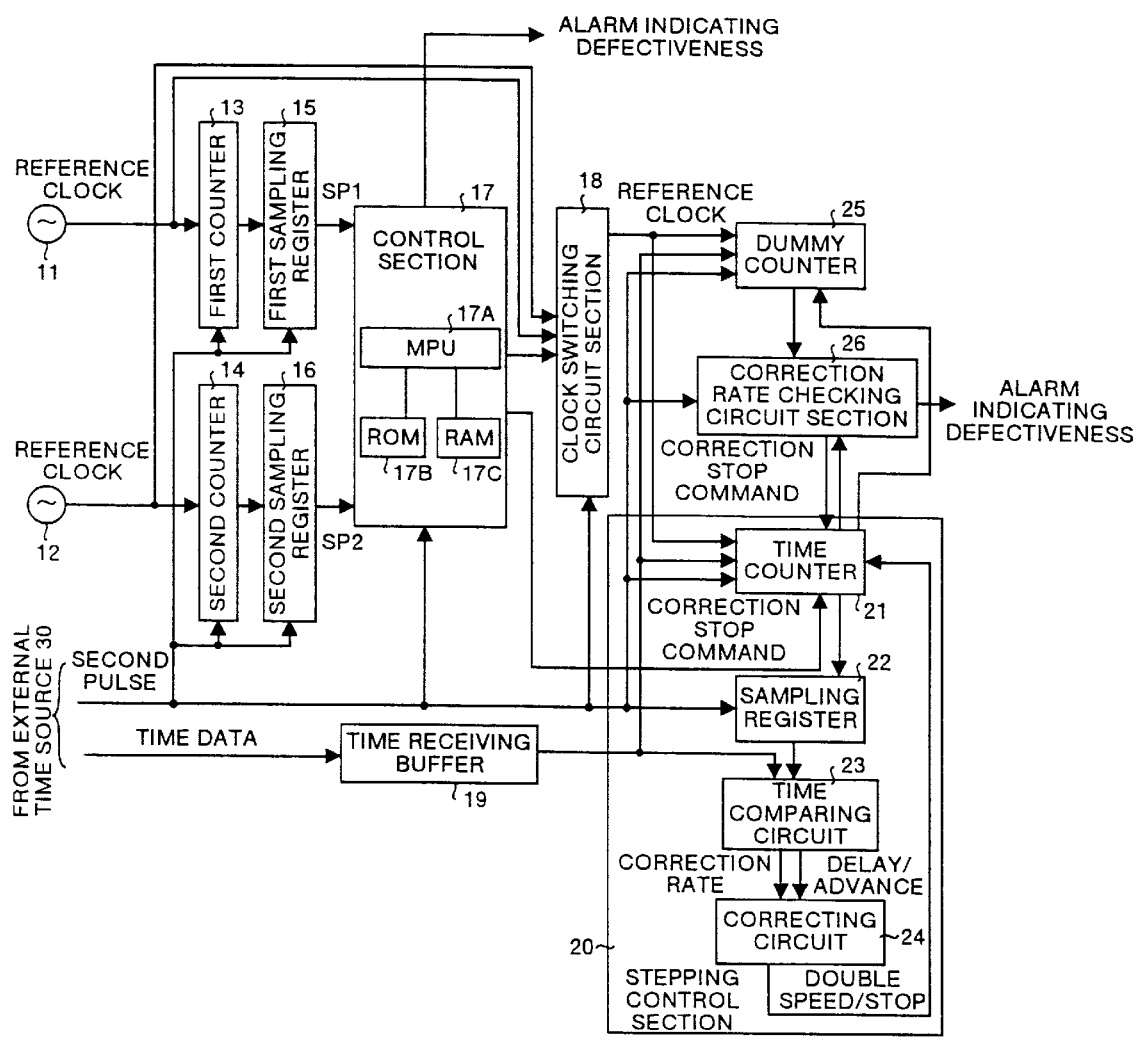
FIG. 2 is a hardware block diagram showing a time control device according to Embodiment 1 of the present invention.

Next, description is made for the hardware configuration for realizing the principles described above. FIG. 2 is a hardware block diagram showing the time control device according to Embodiment 1 of the present invention. The time control device 1 comprises, as shown in FIG. 2, a first oscillator 11 (corresponding to the first oscillating section 2), a second oscillator 12 (corresponding to the second oscillating section 3), a first counter 13 (corresponding to the oscillating precision determining section 4), a second counter 14 (corresponding to the oscillating precision determining section 4). a first sampling register 15 (corresponding to the oscillating precision determining section 4), a second sampling register 16 (corresponding to the oscillating precision determining section 4), a control section 17 (corresponding to the oscillating precision determining section 4), a clock switching circuit section 18 (corresponding to the internal time stepping control section 5), a time receiving buffer 19, a stepping control section 20 (corresponding to the internal time stepping control section 5), a dummy counter 25, and a correction rate checking circuit section 26.

The first oscillator 11 is connected to the first counter 13 as well as to the clock switching circuit section 18, and supplies a reference clock to each of the first counter 13 and clock switching circuit section 18. The second oscillator 12 is connected to the second counter 14 as well as to the clock switching circuit section 18, and supplies a reference clock to each of the second counter 14 and clock switching circuit section 18. The first counter 13 repeatedly executes an operating of counting (incrementing) reference clocks supplied from the first oscillator 11 using a second pulse supplied from the external time source 30 as a trigger and then clearing the count value at the next trigger. The second counter 14 repeatedly executes an operation of counting (incrementing) reference clocks supplied from the second oscillator 12 using a second pulse supplied from the external time source 30 and then clearing the count value at the next trigger.

First sampling register 15 stores a count value obtained from the first counter 13 using a second pulse supplied from the external time source 30 as a trigger, and transmits the count value as a sampling value SP1 at the next trigger to the control section 17. The second sampling register 16 stores a count value obtained from the second counter 14 using a second pulse supplied from the external time source 30 as a trigger, and transmits the count value as a sampling value SP2 at the next trigger to the control section 17.

The control section 17 has a function for confirming correctness of each of the first oscillator 11 and second oscillator 12, and comprises, for instance, an MPU 17A. a ROM 17B, and a RAM 17c for realizing this function. The MPU (Main Processing Unit) 17A operates according to a program stored in the ROM (Read Only Memory) 17B. This MPU 17A detects interruption of a 1 second pulse by the external time source 30 at an arbitrary time interval with a soft time, and each time the interruption is detected, the MPU 17A reads out sampling values SP1, SP2 stored in the first and second sampling registers 15, 16 respectively. Further the MPU 17A determines whether oscillating precision of the first and the second oscillators 11, 12 is acceptable or not by comparing the two sampling values SP1, SP2 read out as described above to each other by way of computing a difference between the two sampling values.

The ROM 17B stores therein a program for operations of the MPU 17A. Functions of this program are as shown in a flow chart in FIG. 4. The RAM (Random Access Memory) 17C is used as a work area for operations of the MPU 17A.

The clock switching circuit section 18 receives reference clocks from the first oscillator 11 and the second oscillator 12 respectively, and selects one of the two reference clocks according to a result of determination by the control section 17 using a second pulse supplied from the external time source 30 as a trigger to switch the clock. The time receiving buffer 19 received time data indicating reference time from the external time source 30 and stores therein the received time data.

The stepping control section 20 comprises a time counter 21, a sampling register 22, a time comparing circuit 23 and a correcting circuit 24. The time counter 21 stores therein time data stored in the time receiving buffer 19 and counts up the time data according to an internal reference clock supplied from the clock switching circuit section 18. This time counter 21 inhibits correction of internal time, namely time data when it receives a correction inhibit command from the control section 17 or the correction rate checking circuit section 26.

The sampling register 22 reads a count value, namely time data provided by the time counter 21 using a second pulse supplied from the external time source 30 as a trigger, stores the time data, and also transmits the stored time data to the time comparing circuit 23. The time comparing circuit 23 receives time data indicating the same time from the sampling register 22 and the time receiving buffer 19 respectively, and computes from a difference between the values a correction rate which is equivalent to a an error (ΔT) in the conventional technology and information concerning advance or delay in the correction.

The correcting circuit 24 transmits an instruction for advancing or delaying the internal time by a correction rate to the time counter 21 according to information on the correction rate as well as on advance or delay supplied from the time comparing circuit 23. The instruction is, like in the example of conventional technology as described above, equivalent to the double speed control when advancing or stop control when delaying the internal time.

The dummy counter 25 copies time data from the time counter 21 using a second pulse supplied from the external time source 30 as a trigger, and provides stepping control over the time data according to a reference clock supplied from the clock switching circuit section 18. The correction rate checking circuit section 26 checks whether the stepping control section 20 is working correctly or not.

This correction rate checking circuit section 26 reads out time data from the dummy counter 25 as well as from the time counter 21 at a point of time when correction control is complete in the stepping control section 20, and determines, only when a time difference between the two types of time data is out of a preset allowable range for correction, that the stepping control section 20 is not working correctly, and issues a correction stop command to the time counter 21.

Figure 4:
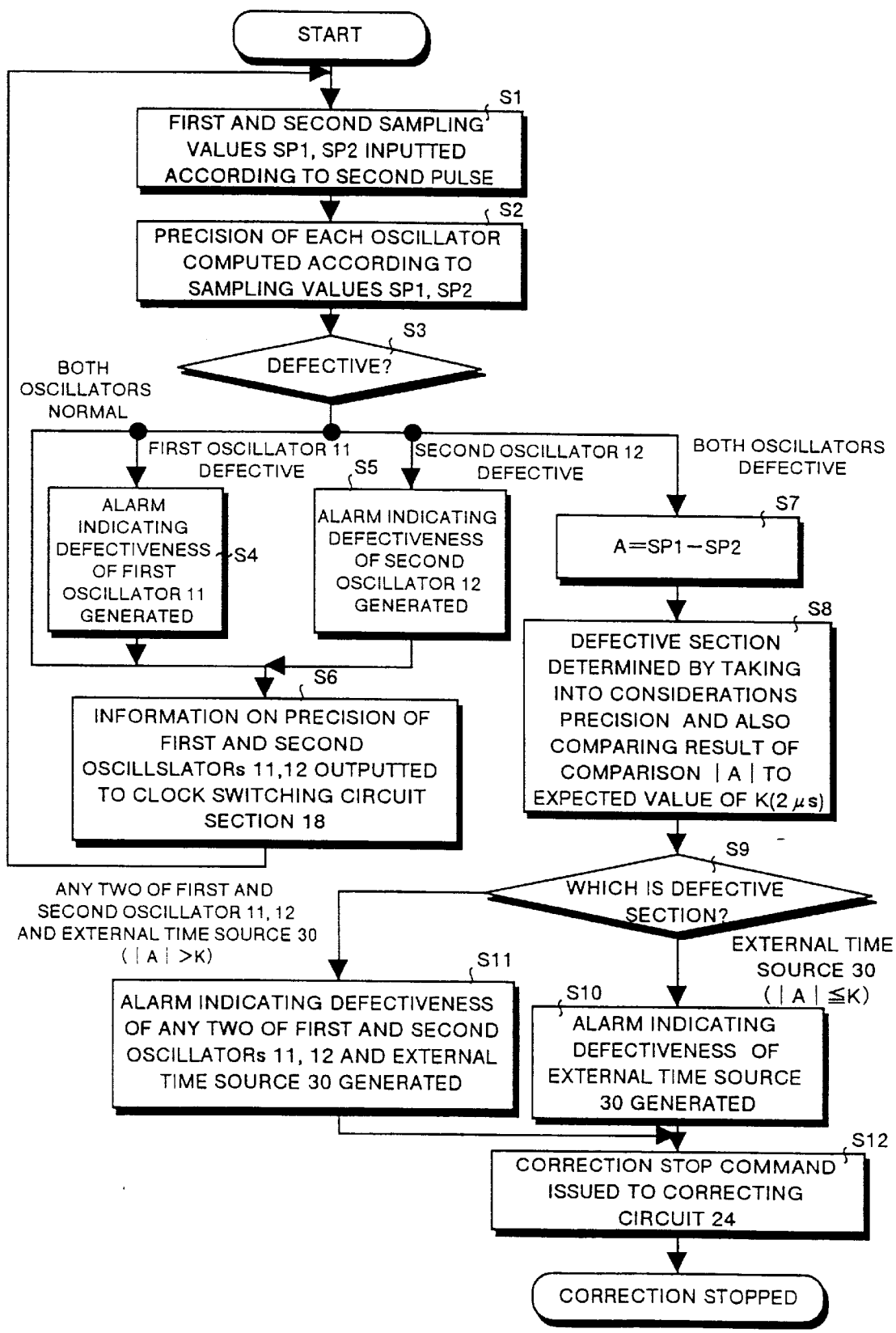
FIG. 4 is a flow chart for illustrating an operation for determining whether oscillator is normal or not by the control section 17 in Embodiment 1.

Next, description is made for operations. FIG. 3 is a view showing a method of determining an abnormal section in Embodiment 1, and FIG. 4 is a flow chart for illustrating an operation for determining non-defectiveness of an oscillator by the control section 17 in Embodiment 1.

Herein a defective section indicates an oscillation source when any defect occurs in an internal reference clock or an external pulse. In FIG. 3, determination for defective section is made for "an external time source" and "an oscillator or an external time source".

At first, whether the first oscillator 11 and the second oscillator 12 are abnormal or not is determined using the following expression (1):

$$|\text{Sampling value}| \leq 1 \text{ (sec)} \pm \text{Precision of quartz oscillator} \quad (1)$$

In the above expression (1), if the first oscillator 11 and the second oscillator 12 are quartz oscillators, the precision is ±1 ppm, namely 1 $\mu$s per second, and for this reason whether the first oscillator 11 and the second oscillator 12 are defective or not can be determined using the following expressions (2) and (3):

$$|SP1| \leq 1(\text{sec}) \pm 1 \ (\mu s) \quad (2)$$

$$|SP2| \leq 1(\text{sec}) \pm 1 \ (\mu s) \quad (3)$$

Which of the oscillators is defective can be determined by checking whether each of the expressions (2) and ((3) is satisfied or not.

Herein when both the first sampling value SP1 in the first sampling register 15 and second sampling value SP2 in the second sampling register 16 are within an error range of ±1 ($\mu$s) per second, it is determined that both the first oscillator 11 and the second oscillator 12 are normal.

When the sampling value SP1 is out of the error range of ±1 ($\mu$s) per second and the sampling value SP2 is within the error range of ±1 $\mu$s per second, it is determined that the defective section is the "first oscillator 11".

When the sampling value SP1 is within the error range of ±1 ($\mu$s) per second and the sampling value SP2 is out of the error range of ±1 $\mu$s per second, it is determined that the defective section is the "second oscillator 12".

When both the samples values SP1, SP2 are out of the error range of ±1 $\mu$s per second, it is determined that the defective section is either one of "the first oscillator 11 and the second oscillator 12" or "the external time source 30". In this case, an defective section cab be estimated using the following expression (4):

$$|SP1 - SP2| \leq 2 \ (\mu s) \quad (4)$$

In this expression (4), it can be determined that either one of the first and the second oscillators 11, 12 is defective, or that the external time source 30 is defective. In FIG. 3, if both the expressions (2) and (3) are not satisfied and the expression (4) is satisfied, it is determined that the defective section is the external time source 30, and on the other hand, if all the expressions (2), (3) and (4) are not satisfied, it is determined that the defective section is the first and the second oscillators 11, 12 or the external time source 30.

The flow chart in FIG. 4 shows the relation described above with operations. In FIG. 4, the control section 17 at first receives the first sampling value SP1 and second sampling value SP2 using a second pulse as a trigger (step S1), and then checks whether each of the sample values is within the error range of ±1 $\mu$s or not using the expressions (2) and (3) (step S2). Thus oscillating precision of the first oscillator 11 and the second oscillator 2 is checked according to the errors of the first and second sampling values SP1, SP2 respectively.

Then, whether the first and the second oscillators 11, 12 are defective or not is determined according to the oscillating precision obtained in step S2 (step S3). At first, when the expression (2) is not satisfied and at the same time the expression (3) is satisfied, namely when the sampling value SP1 is not within the error range of ±1 $\mu$s per second and at the same time the sampling value SP2 is within the error range of ≅1 $\mu$s per second, it is determined that the defective section is the "first oscillator 11" (step S3), and processing shifts to step S4.

When it is determined that the first oscillator 11 is defective (step S3), the processing for generating an alarm to indicate defectiveness of the first oscillator 11 is executed (step S4). In this case, information on precision of the first and second oscillators 11, 12 is outputted to the clock switching circuit sections 18 (step S6). Then the processing returns to step S1.

When the expression (2) is satisfied but the expression (3) is not satisfied, namely when the sampling value SP1 is within the error range of ±1 $\mu$s per second and at the same time the sampling value SP2 is not within the error range of ±1 $\mu$s per second, it is determined that the defective section is the "second oscillator 12" (step S3), and the processing shifts to step S5.

When it is determined that the second oscillator 12 is defective (step S3), processing to generating an alarm indicating defectiveness of the second oscillator 12 is executed (step S5). Also in this case, information on oscillating precision of the first and the second oscillators 11, 12 is outputted to the clock switching circuit section 18 (step S6). Then the processing returns to step S1.

When both the expression (2) and expression (3) are satisfied, namely when both the first sampling value SP1 in the first sampling register 15 and second sampling value SP2 in the second sampling register 16 are within the error range of ±1 $\mu$s per second, it is determined that both the oscillators are non-defective, and the processing shifts to step S6. Also in this case, information on oscillating precision of the first and the second oscillators 11, 12 is outputted to the clock switching circuit section 18 (step S6). Then the processing shifts to step S1.

When both the expression (2) and expression (2) are not satisfied, namely when both of the sampling values SP1, SP2 are not within the error range of ±1 $\mu$s per second, it is understand that both of the oscillators are defective (step S3), and further the processing shifts to step S7 to estimates the defective section using the expression (4) described above.

In step S7, a difference A (absolute value) is obtained through comparison between the first sampling values SP1 and second sampling value SP2 through the expression (4). Then the determination on abnormal state is executed by means of comparison of an absolute value of the difference A and an expected value K (in this case, 2 $\mu$s) (step S8). In this step, the oscillating precision of each oscillator obtained in step S2, namely information as to whether oscillating precision of each oscillator is within an allowable error range or not is added thereto.

When it is determined in step S8 that the external time source 30 is defective ($|A| \pm K$) (step S9), processing for generating an alarm indicating defectiveness of the external time source 30 is executed (step S10). In this case, a correction stop command is issued to the stepping control section 20 (step S12, and the system enters in a correction stopped state.

When it is determined in step S8 that any two of the first oscillator 11, second oscillator 12, and external time source 30 are defective ($|A|>K$) (step S9), processing for generating an alarm indicating that any two of the first oscillator 11, second oscillator 12 and external time source 30 are defective is executed (step S11). Also in this state, the correction stop command is issued to the stepping control section 20 (step S12), and the system enters the correction stopped state.

As described above, the operating sequence from step S1 to step S12 is repeatedly executed according to second pulses, and when the processing reaches step S12, the operation for correction is stopped until the system is reset for maintenance or for other reasons.

Figure 5:
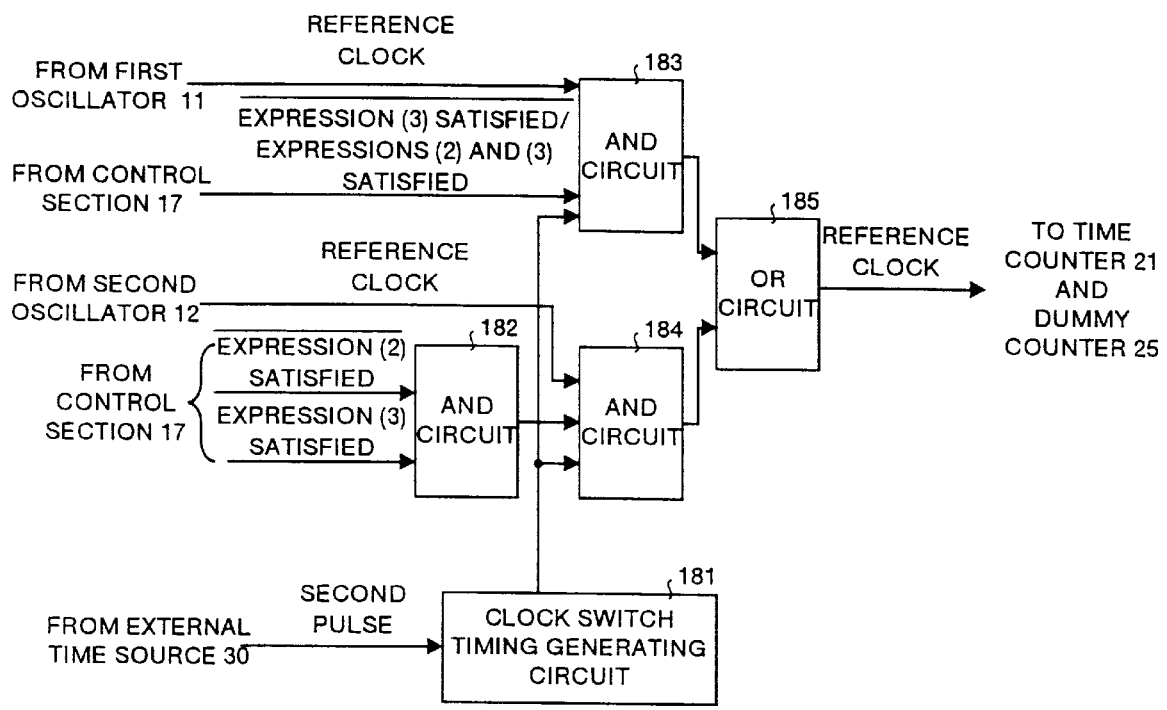
FIG. 5 is a block diagram showing configuration of a clock switching circuit section in Embodiment 1.

The clock switching circuit section 18 comprises, as shown in FIG. 5, a clock switch timing generating circuit 181, AND circuits 182 to 184, and an OR circuit 185. The clock switch timing generating circuit section 181 receives a second pulse from the external time source 30, and outputs a clock switch signal to the AND circuits 183, 184 using the second pulse as a trigger.

The AND circuit 182 computes a logical product of a signal satisfying the expression (2) and a signal satisfying the expression (3) from the control section 17, and outputs the result to the AND circuit 184. The AND circuit 183 computes a logical product of a signal satisfying the expressions (2) and (3) and a clock switch signal of the clock switching timing generating circuit 181 according to a reference clock from the first oscillator 11 as well as to the control section 17, and outputs the result to the OR circuit 185.

The AND circuit 184 computes a logical product of a reference clock oscillated by the second oscillator 12, an output signal from the AND circuit 182, and a clock switch signal from the clock switching timing generating circuit 181, and outputs the logical product to the OR circuit 185. The OR circuit 185 computes a logical sum of a the results of the AND circuits 183 and 184, and supplies a reference clock, which a reference clock of the first or the second oscillators 11, or 12, to the time counter 21 as well as to the dummy counter 25.

The clock switching circuit section 18 provides control, as shown in FIG. 5, for switching to a reference clock oscillated by the first oscillator 11 or to that oscillated by the second oscillator 12 according to whether the expressions (2) and (3) are satisfied or not. Namely, as shown in FIG. 6, 7 items (7 modes) are conceivable for switching a clock. Item No. 1 is a case when all of the expressions (2), (3), and (4) are not satisfied. In this case, anticipated defective sections are any two or more of the first and the second oscillators 11, 12 and the external time source 30, and it is determined that correction of internal time itself is to be inhibited. For this reason, clock switching is invalid.

Item No. 2 is a case when the expressions (2) and (4) are not satisfied and at the same time the expression (3) is satisfied. In this case, an anticipated defective section is the first oscillator 11, and correction of the internal time is allowed with the reference clock oscillated by the second oscillator 12 selected. Item No. 3 is a case when the expressions (4) and (3) are not satisfied and at the same time the expression (2) is satisfied. In this case, an anticipated defective section is the second oscillator 12, and correction of the internal time is allowed with a reference clock oscillated by the first oscillator 11 is selected as a reference clock supplier.

Item No. 4 is applicable when the expression (4) is satisfied and at the same time the expressions (2) and (3) are not satisfied. In this case, an anticipated defective section is the external time source 30, and correction of the internal time is inhibited. For this reason, clock switching becomes invalid.

Item No. 5 is a case when the expressions (3) and (4) are satisfied and at the same time the expression (2) is not satisfied. In this case, an anticipated defective section is the first oscillator 11, and correction of the internal time is allowed with a reference clock oscillated by the second oscillator 12 is selected as a reference clock supplier. Item No. 6 is applicable when the expressions (2) and (4) are satisfied and at the same time the expression (3) is not satisfied. In this case, an anticipated defective section is the second oscillator 12, and correction of the internal time is allowed with a reference clock oscillated by the first oscillator 11 is selected as a reference clock supplier.

Item No. 7 is applicable when all of the expressions are satisfied. In this case, there is no defective section, and the current reference clock may be used as it is, but therein a reference clock oscillated by the first oscillator 11 is preferentially employed.

Thus, when clock switching is complete in the clock switching circuit section 18, the clock switching circuit section 18 supplies a reference clock oscillated by the selected oscillator to the time counter 21 as well as to the dummy counter 5.

The relation described above can be described with the circuit operations shown in FIG. 5 as follows. The circuit operations realize the functions described in relation to FIG. 6. In FIG. 5, a reference clock from the first oscillator 11 is always inputted into the AND circuit 183, and a signal for adjusting clock switching timing is always inputted thereto according to a second pulse. Similarly, a reference clock from the second oscillator 12 is inputted to the AND circuit 184, and also a signal for adjusting clock switching timing is inputted thereto according to as second pulse.

For this reason, so long as the AND circuit 183 does not receive a signal "1" validating a reference clock oscillated by the first oscillator 11 from the control section 17, the AND circuit outputs "0". Namely, when oscillating precision of the second oscillator 12 can not satisfy the expected value (1 $\mu$s), or when oscillating precision of both the first and the second oscillators 11, 12 satisfies the expected value (1 $\mu$s), "1" is outputted from the AND circuit 183 as a result of computing by the control section 17.

Also, so long as the AND circuit 184 does not receives a signal "1" validating a reference clock oscillated by the second oscillator 12 from the control section 17, "0" is outputted from the AND circuit 184. When oscillating precision of the first oscillator 11 does not satisfy the expected value and at the same time oscillating frequency of the second oscillator 12 satisfies the expected value, "1" is outputted as a result of computing from the AND circuit 182.

As described above, when the AND circuit 183 outputs the validating signal "1", other AND circuit 184 outputs an invalidating signal "0". so that a reference clock oscillated by the first oscillator 11 is outputted from the OR circuit 185. This reference clock is supplied to the time counter 21 as well as to the dummy counter 25.

On the contrary, when the AND circuit 184 outputs the validating signal "1", another AND circuit 183 outputs the invalidating signal "0", so that a reference clock oscillated by the second oscillator 12 is outputted from the OR circuit 185. This reference clock is supplied to the time counter 21 as well as to the dummy counter 25.

When oscillating precision of both the first and the second oscillators 11 and 12 is excellent, the expression (2) is satisfied, so that the invalidating signal "0" is outputted from the AND circuit 182. In this case, finally a reference clock oscillated by the first oscillator 11 is outputted from the OR circuit 185.

With the controls as described above, stepping control for the time counter 21 as a timer oscillating a preferable reference clock is executed, but time in the time counter 21 in the stepping control section 20 is executed for realizing higher precision of the internal time itself supplied by the time counter 21, and this is described in detail below.

Time data indicating a reference time is set in the time counter 21 as well as in the dummy counter 25 from the external time source 30 (to describe more accurately, from the time receiving buffer 19) using a second pulse as a trigger. Then the time counter 21 and the dummy counter 25 count time according to a reference clock of either one of the first and the second oscillators 11, 12 selected by the clock switching circuit section 18. In this step, the time counter 21 stores the time data being counted at an arbitrary time interval using a second pulse as a trigger.

The time comparing circuit 23 compares a value stored in the sampling register 22 to time data supplied from the external time source (to describe more accurately, from the time receiving buffer 19), and computes information for a correction rate and delay or advance. Then the computed correction rate and information on delay or advance are given to the correcting circuit 24.

The correcting circuit 24 decides which of double speed control and stop control should be provided over counting of the current internal time according to the information on a correction rate as well as on delay or advance given from the time comparing circuit 23, and instructs the decided control to the time counter 21. As a result, when double speed control is instructed, a counting speed in the time counter 21 is raised to a higher counting speed to respond to a reference time in the external time source 30, and on the contrary when stop control is instructed to the time counter 21, counting of the current internal time is once stopped to respond to the reference time in the external time source 30.

With the operation described above, correction of internal time by the stepping control section 20 is complete, but further to check whether the stepping control section 20 is accurately working or not, checking is executed by the correction rate checking circuit 26, and description thereof is made below.

As described above, when correction of time data in the time counter 21 is complete in the stepping control section 20, the correction rate checking circuit section 26 reads out from the time counter 21 as well as from the dummy counter 25, and compares the two types of time data to each other. In this step, a value obtained by subtracting a counter value by the dummy counter 25 from a count value by the time counter 21 is a correction rate instructed by the correcting circuit 24. When this correction rate is a positive value, it indicates that the double speed control was provided to correct delay, and if the correction rate is a negative value, it indicates that stop control was provided because the internal time was fast.

In the correction rate checking circuit 26, if the instructed correction value is within a preset allowable range, it is determined that the correcting circuit 24 is working correctly, and if the correction value is out of the allowable range, it is determined that the correcting circuit 24 is working wrongly.

When it is determined in the determining step that the correcting circuit 24 is working wrongly, an alarm indicating that the stepping control section 20 (correcting circuit 24) is defective is transmitted to the outside, and a correction stop command for stopping the subsequent operation for correction is issued to the stepping control section 20 (time counter 21). On the other hand, when it is determined in the determining step that the correcting circuit 24 is working correctly, a count value (time data) by the time counter 21 is stored in the dummy counter 25 for checking a correction rate next time when the correction rate is computed.

As described above, according to Embodiment 1, sampling values during a certain period of time are obtained from reference clocks from the first oscillator 11 as well as from the second oscillator 12 each having the same oscillation frequency, according to pulses from the external time source 30, and the sampling values are compared to an expected value for the certain period of time to select a reference clock oscillated by an oscillator having normal oscillating frequency for providing stepping control over the internal time. With this feature, so long as at least one of the reference clocks is normal, stepping control can be provided over the internal time using the reference clock, so that high precision and high reliability of the internal time can be maintained.

When it is determined that oscillating precision f both the first and the second oscillators 11, 12 is defective, an alarm indicating that the first and the second oscillators 11, 12 or the external time source 30 is abnormal is generated, so that a defective section relating to stepping control can be detected by a user soon. With this feature, it is possible to prevent an unexpected trouble which may occur due to continued use even after occurrence of a trouble.

When it is determined that oscillating precision of both the first and the second oscillators 11, 12 is defective, an alarm indicating defectiveness of the first and the second oscillators 11, 12 as well as of the external time source 30 is generated, and at the same time correction of the internal time by the external time source 30 is not performed, so that a defective section relating to stepping control is soon alerted to the user, and at the same time the time stepping function is automatically stopped. With this feature, it is possible to automatically start the function for preventing an unexpected trouble without requiring intervention by an operator after occurrence of a trouble.

Also it is possible to compare time data stored in the time counter 21 to that supplied from the external time source 30 for correcting time data stored in the time counter 21 according to a result of comparison of the time data.

Also it is possible to determine whether time is to be advanced or delayed and to correct the time data for advancing or delaying the time data according to a result of determination in the time comparing circuit 23.

When a difference between time in the time counter 21 and that in the dummy counter 25 is larger than a preset value, an alarm indicating that the stepping control section 20 is defective is generated, so that a defective section relating to time correction can be alerted to the user soon. With this feature, it is possible to prevent an unexpected trouble which may occur due to continued use even after occurrence of a trouble.

Also when an alarm indicating that the stepping control section 20 is defective is generated, correction of internal time by the stepping control section 20 is stopped simultaneously, so that a defective section relating to time correction can be alerted to the user soon, and at the same time the time correcting function is automatically stopped. With this feature, the function for preventing an unexpected trouble can automatically be started without requiring an intervention by the operation after occurrence of a trouble.

In Embodiment 1 described above, when it is determined that both the first and the second oscillators 11 12 are normal, a reference clock oscillated by the first oscillator 11 is preferentially used, but like in Embodiment 2 described hereafter, even when both the first and the second oscillators 11 and 12 are normal, an oscillator oscillating a reference clock with higher oscillating precision may be selected for use. It should be noted that general configuration of and operations in Embodiment 2 are the same as those of and in Embodiment 1, description is made only for different portions thereof.

Figure 7:
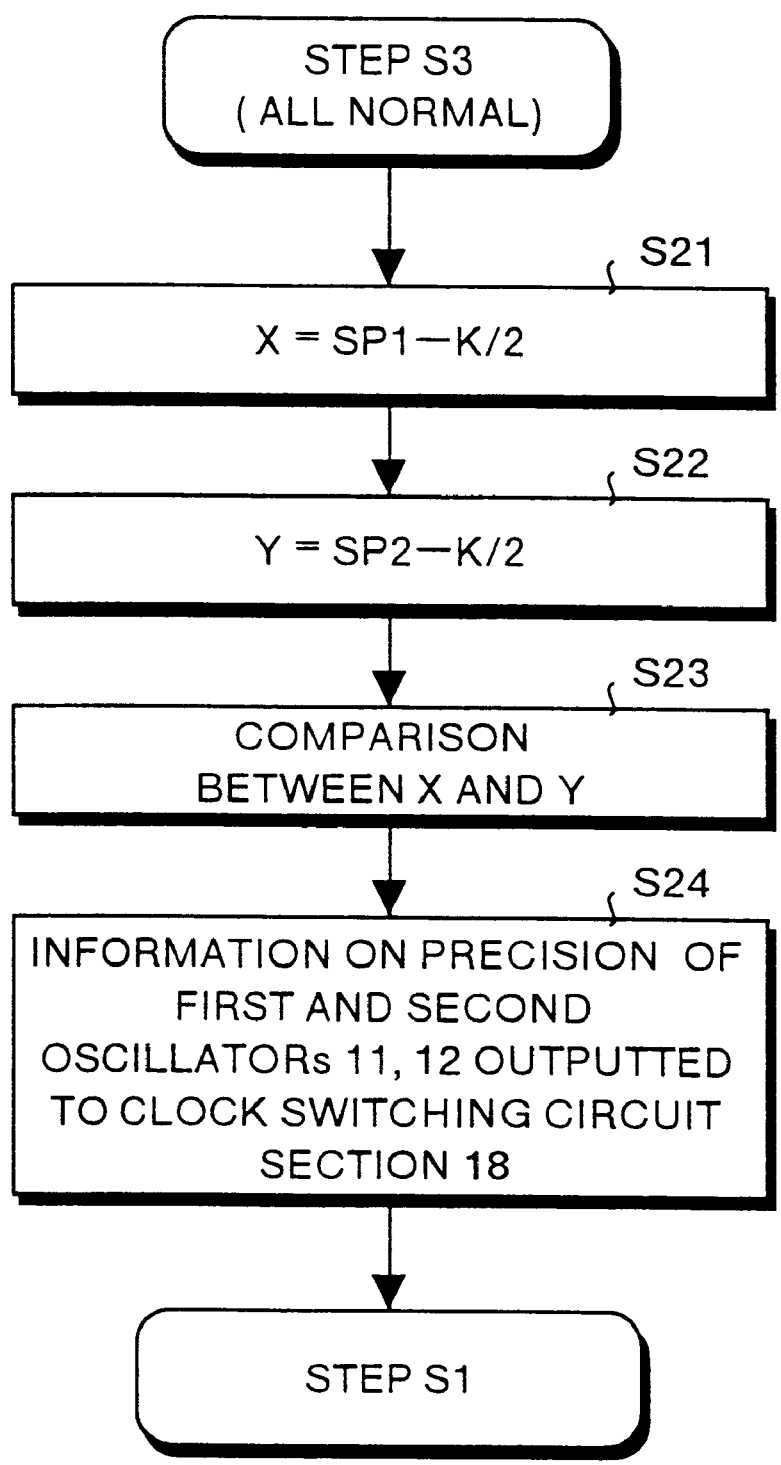
FIG. 7 is a flow chart for illustrating key portions of the operation for checking non-defectiveness of the oscillator in Embodiment 2 of the present invention.

At first description is made for a control section according to Embodiment 2 of the present invention. It should be noted that operations of the control section as a whole are executed according to the flow chart shown in FIG. 4. FIG. 7 is a flow chart for illustrating key portions of the operations for checking non-defectiveness of an oscillator in Embodiment 2.

In step S3 of FIG. 4, if it is determined that oscillating precision of both the first and the second oscillators 11, 12 is normal, the processing shifts to step S21 as shown in FIG. 7. In step S21, K/2 as the expected value, namely ±1 μs is subtracted from the first sampling value SP1 according to the following expression (5). The resultant value is an error X in precision. Namely, $$X = SP1 - K/2 \qquad (5)$$

Similarly, in step S22, K/2 as an expected value, namely 1 μs is subtracted from the second sampling value SP2 according to the expression (6). The resultant value is an error Y in precision. Namely, $$Y = SP2 - K/2 \qquad (6)$$

Then the error X is compared to the error Y (step S23), and information on precision indicating whether each of the expressions (2) to (6) is satisfied or not is outputted to the clock switching circuit section 18 (step S24). Then the processing returns to step S1.

Figure 9:
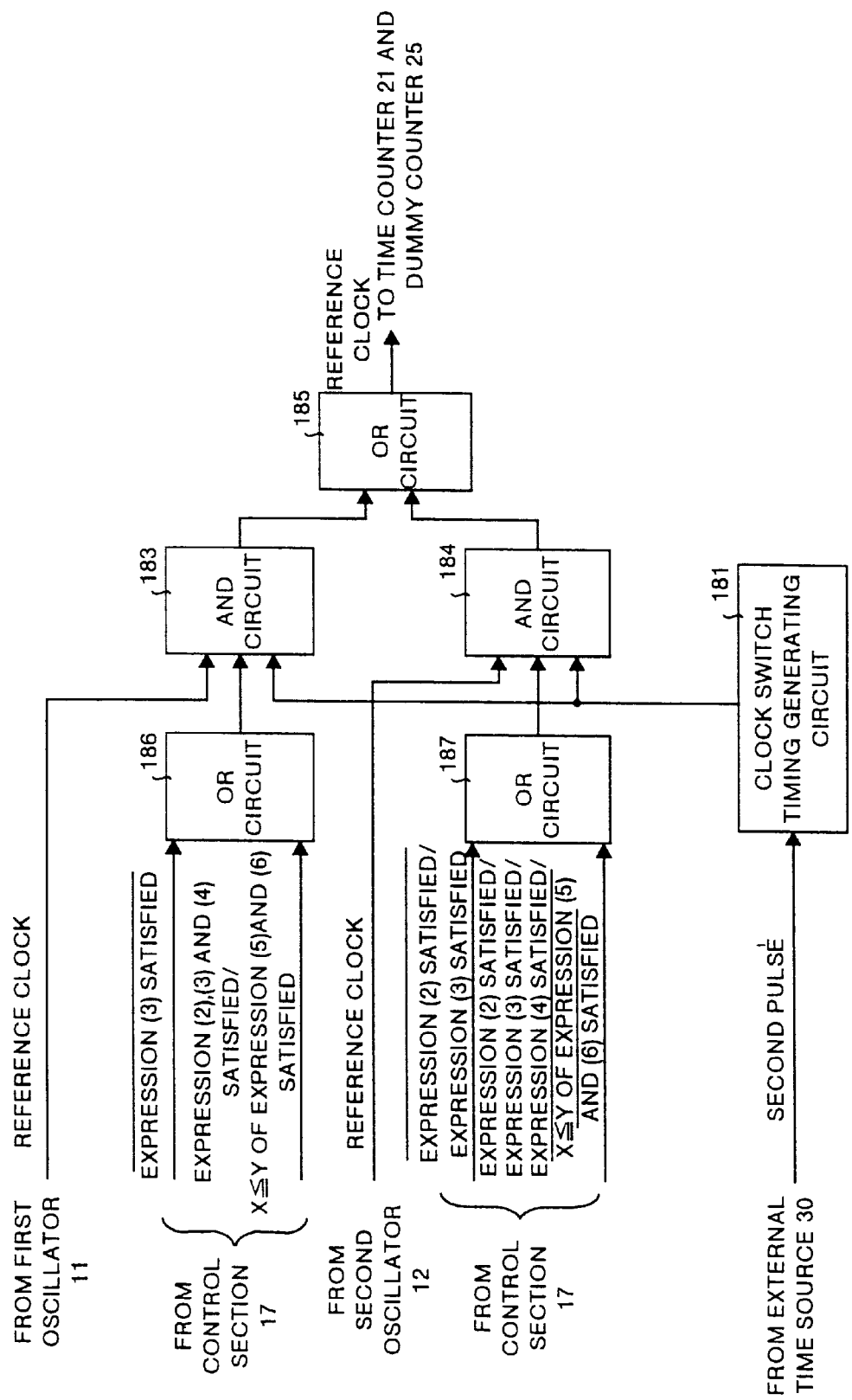
FIG. 9 is a block diagram showing configuration of the clock switching circuit section in Embodiment 2.
Figure 10:
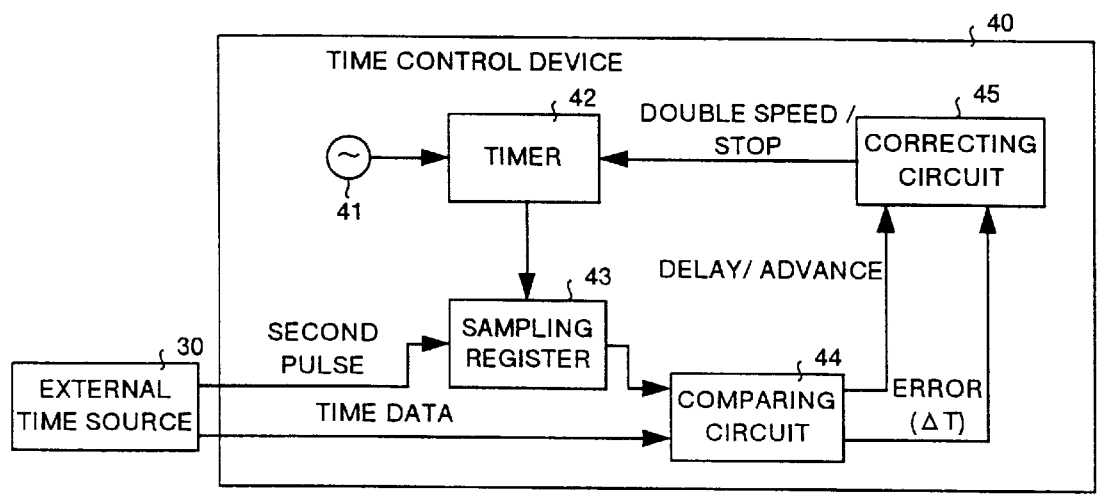
FIG. 10 is a block diagram showing configuration of a time control device based on the conventional technology.

Next, description is made for clock switching in Embodiment 2. FIG. 8 is an explanatory view for illustrating a clock switching method according to Embodiment 1, and FIG. 9 is a block diagram showing configuration of the clock switching circuit section according to Embodiment 2.

FIG. 8 shows a case where it is determined that oscillating precision of both the first and the second oscillators 11, 12 is normal, and a case where it is determined that the oscillating precision is incorrect is as shown in FIG. 6. A number of items when the oscillating precision is normal is three; 7—1, 7—2, and 7—3 as shown in FIG. 8.

Shown in Item No. 7—1 is a case where a result of determination in step S23 above is that X is smaller than Y ( X <Y ). Namely, as the error Y is larger than the error X, it is determined that oscillating precision of the first oscillator 11 is better than that of the second oscillator 12. In this case, the first oscillator 11 is selected while the second oscillator 12 is not selected, and a reference clock oscillated by the first oscillator 11 is employed as a reference clock in clock switching.

Shown in Item No. 7—2 is a case where a result of determination in step S23 above is that X is equal to Y (X>Y). Namely, as the errors X and Y are equal to each other, it is determined that oscillating precision of both the first and the second oscillators 11, 12 is excellent. In this case, either one of the first and the second oscillators 11, 12 may be selected, but herein the first oscillator 11 is selected for convenience of processing, while the second oscillator 12 is not selected, and a reference clock oscillated by the first oscillator 11 is employed as a reference clock in clock switching.

Shown in Item No. 7—3 is a case where a result of determination in step S23 is that X is larger than X ( X>Y). Namely, as the error X is larger than the error Y, it is determined that oscillating precision of the second oscillator 12 is better. In this case, the second oscillator 12 is selected while the first oscillator 11 is not selected, and a reference clock oscillated by the second oscillator 12 is employed as a reference clock in clock switching.

Configuration of the clock switching circuit section for realizing the clock switching described above is as shown in FIG. 9. In FIG. 9, the same reference numeral is assigned to a circuit similar to the clock switching circuit section 18 described above.

In this Embodiment 2, the expressions (5) and (6) are used in addition to the expressions (2) to (4), so that, also in the clock switching circuit section shown in FIG. 9, a logical circuit for rounding results of computing through each of the expressions for selecting a reference clock to be employed is added. Namely in the circuit configuration, the AND circuit 182 described above is eliminated, while the two OR circuits 186 and 187 are added.

The OR circuit 186 is provided on a signal line satisfying the expression (3) in FIG. 9, and assuming that reversion of establishment of the expression (3) is "1", a case where the expressions (2), (3), and (4) are satisfied and also the expressions (5) and (6) satisfy the conditions that X≦Y is fetched as "1" and subjected to the OR processing. The OR circuit 187 is a circuit used in place of the AND circuit 182 in FIG. 5, and this circuit fetches, assuming that reversion of establishment of the expression (2) and establishment of the expression (3) simultaneously occur, a case where the expressions (2), (3), and (4) are satisfied and also the expressions (5) and (6) satisfy that X<Y as "1" and executes the OR processing.

Next, description is made for operations in this circuit configuration. The circuit operations realize the functions described in relation to FIG. 6 and FIG. 8. A reference clock from the first oscillator 11 is inputted into the AND circuit 183, and also a signal for adjusting timing for clock switching is inputted according to a second pulse. Similarly, a reference clock from the second oscillator 12 is always inputted into the AND circuit 184, and also a signal for adjusting timing for clock switching is inputted according to as second pulse.

For this reason, the AND circuit 183 outputs "0" so long as the circuit does not receives a signal of "1" for validating the reference clock from the first oscillator 11. Similarly, the AND circuit 184 outputs "0" so long as the circuit does not receives the signal of "1" for validating a reference clock from the second oscillator 12.

When oscillating precision of the second oscillator 12 does not satisfy an expected value (1 μs), when both of the oscillators are normal but oscillating precision of the first oscillator 11 is better, the OR circuit 186 outputs "1".

When oscillating precision of the first oscillator 11 does not satisfy the expected value (1 μs) and at the same time oscillating precision of the second oscillator 12 satisfies the expected value, or when both of the oscillators are normal but precision of the second oscillator 12 is better, the OR circuit 187 outputs "1" as a result of computing.

As described above, when the OR circuit 186 outputs the validating signal of "1", other OR circuit 187 outputs the invalidating signal of "0". so that "1" and "0" are outputted from the AND circuits 183, 184 respectively. As a result, a reference clock oscillated by the first oscillator 11 is outputted from the OR circuit 185. This reference clock is supplied to the time counter 21 as well as to the dummy counter 25.

On the contrary, when the OR circuit 187 outputs the validating signal of "1", another OR circuit 186 outputs the invalidating signal of "0", so that "0" and "1" are outputted from the AND circuits 183, 184 respectively. As a result, a reference clock oscillated by the second oscillator 12 is outputted from the OR circuit 185. This reference clock is supplied to the time counter 21 as well as to the dummy counter 25.

When it is determined that oscillating precision of both the first and the second oscillators 11, 12 is normal, a validating signal of "1" is outputted from the OR circuit 186, but as the expression (2) is satisfied and the expressions (4) and (5) satisfy the condition that X is not more than Y (X≦Y), the OR circuit 186 outputs the invalidating signal of "0". In this case, finally a reference clock oscillated by the first oscillator 11 is outputted from the OR circuit 185.

As described above, with Embodiment 2, in addition to the effects achieved in Embodiment 1, when it is determined that oscillating precision of both the first and the second oscillators 11. 12 is normal, an oscillator having a smaller error between the twoof the first and the second oscillators 11, 12 is selected, so that even if there occurs no failure of internal oscillation, always oscillation with high precision can be maintained. With this feature, it is possible to provide internal time with higher precision.

In Embodiment 1 and Embodiment 2, when it is determined that oscillating precision of both the first and the second oscillators 11, 12 is bad and that also the external time source 30 is defective, an alarm indicating the defectiveness is generated and stepping control is not performed, but the present invention is not limited to the above embodiments, and the pulse supply source may be switched from the external time source 30 to a unit for generating second pluses internally by means of software. With this feature, even if defectiveness of the external time source 30 is suspected, it is possible to suppress bad effects by internal time to related sections can be suppressed to the minimum level by replacing the external time source 30 with an internal one.

Although two oscillators are used and clock switching is executed between the two oscillators in Embodiment 1 and Embodiment 2 both, the present invention is not limited to the above embodiments, and three or more oscillators each oscillating at the same frequency may be provided.

Embodiments 1 and 2 of the present invention are described above, but various modifications are possible within the gist of this invention, and such modifications are within a scope of this invention.

As described above, with the present invention, oscillating precision of a first oscillator and a second oscillator each having the same oscillation frequency is determined according to the timing of a signal supplied from an external time source, and a reference clock oscillated by either one of the first and the second oscillators is used according to a result of determination for providing stepping control over the internal time, so that stepping control can be provided over the internal time by using a correct reference clock, whereby there is provided the advantage that it is possible to keep high precision and high reliability of the internal time.

With the present invention, oscillating precision of each of the first and the second oscillators each having the same oscillation frequency is determined according to the timing of a signal supplied from an external time source, and when it is determined that oscillating precision of both the first and second oscillators is not normal, correction of stepping of internal time according to the external time source is not performed, so that incorrect stepping correction can be prevented, whereby there is provided the advantage that it is possible to keep high precision and high reliability of the internal time.

With the present invention, sampling values for a certain period of time are obtained from the reference clocks of the first and the second oscillators each having the same frequency according to pulses from an external time source, and stepping control over the internal time is provided by using the reference clocks of the oscillator having normal oscillating precision determined through comparison of the sampling values to the expected values for the certain period of times, so that, so long as either one of the reference clocks is correct, stepping control can be provided over the internal step using the reference clock, whereby there is provided the advantage that it is possible to keep high precision and high reliability of the internal time.

With the present invention, when it is determined that oscillating precision of both the first and the second oscillators is incorrect, an alarm indicating defectiveness of the first and the second oscillators as well as of the external time source is generated, so that a defective section relating to time stepping is alerted to a user early, whereby there is provided the advantage that it is possible to prevent unexpected failure which might occur due to continued use of the internal time even after occurrence of the failure.

With the present invention, when it is determined that oscillating frequency of both the first and the second oscillators is incorrect, an alarm indicating defectiveness of the first and the second oscillators as well as of the external time source is generated, and also correction of the internal time is not performed, so that a defective section relating to time stepping is alerted to a user early, and at the same time the time stepping function is automatically stopped, whereby there is provided the advantage that it is possible to make a function for preventing an unexpected failure automatically operate without requiring any intervention by an operator.

With the present invention, when it is determined that oscillating precision of both the first and the second oscillators is normal, the oscillator having a smaller error is selected as an oscillator to be used, so that high precision oscillation can be maintained without being troubled by failure in internal oscillation, whereby there is provided the advantage that it is possible to obtain a time control device which can provide more precise internal time.

With the present invention, there is provided the advantage that it is possible to obtain a time control device which can provide stepping control over time data stored in a time counter according to a reference clock oscillated by the first or the second oscillating unit.

With the present invention, there is provided the advantage that it is possible to obtain a time control device which can correct time data stored in a time counter by comparing time data in the time counter to time data supplied from an external time source and according to a result of comparison of the time data.

With the present invention, there is provided the advantage that it is possible to obtain a time control device which can correct advance or delay of time data by making determination as to time is advanced or delayed according to a result of time data and according to a result of the comparison.

With the present invention, when a difference between time in a time counter and that in a dummy counter is larger than a specified value, an alarm indicating that the stepping control unit is defective is generated, so that a defective section relating to time correction is reported early to an user, whereby there is provided the advantage that it is possible to obtain a time control device which can prevent unexpected failure which might occur due to continued use of the internal time even after occurrence of the failure.

With the present invention, when an alarm indicating that the stepping control unit is defective is generated, correction of internal time by stepping control unit is stopped simultaneously, so that a defective section relating to time correction is reported early to an user, and at the same time the time correcting function is automatically stopped, whereby there is provided the advantage that it is possible to obtain a time control device which can prevent unexpected failure which might occur due to continued use of the internal time even after occurrence of the failure.

This application is based on Japanese patent applications No. HEI 9-287072 and No. HEI 10-188812 filed in the Japanese Patent Office on Oct. 20, 1997 and Jul. 3, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A time control device for controlling stepping of internal time by referring to a reference time in an external time source comprising:

a plurality of oscillators oscillating at a reference clock having the same frequency;

a sampling unit for sampling the reference clocks oscillated by said oscillators according to a pulse supplied at every specified time interval by said external time source;

a determining unit for calculating an amount of error by comparing the sampling values obtained by said sampling unit to an expected value equivalent to the specified time interval and determining whether oscillating precision of each of said oscillators is normal or not from the amount of error;

a clock switching unit for switching the reference clock source to some other oscillator when said determining unit determines that the oscillating precision of the oscillator whose reference clock is currently being used is inferior; and a stepping control unit for controlling stepping of the internal time according to the reference clock of the oscillator to which said clock switching unit has switched the reference clock source.

2. A time control device according to claim 1; wherein said determining unit generates an alarm indicating defectiveness of said oscillators and of said external time source when it determines that the oscillating precision of all of said oscillators is inferior.

3. A time control device according to claim 1; wherein said determining unit generates an alarm indicating defectiveness of said oscillators and of said external time source and stops the correction of the internal time by said stepping control unit when it determines that the oscillating precision of all of said oscillators is inferior.

4. A time control device according to claim 1; wherein said clock switching unit switches the reference clock source to an oscillator having the smallest amount of error among said oscillators when said determining unit determines that the oscillating precision of all of said oscillators is good.

5. A time control device according to any of claim 1; wherein said stepping control unit has a time counter for storing time data supplied from said external time source as time data to be used as an internal time, and provides stepping control over the time data stored in said time counter according to a reference clock oscillated by an oscillator currently being used as a source of the reference clock.

6. A time control device according to claim 5; wherein said stepping control unit compares the time data stored in said time counter to time data supplied from said external time source and corrects the time data stored in said time counter according to a result of comparison of the two time data.

7. A time control device according to claim 6; wherein said stepping control unit determines according to a result of comparison of said two time data whether time is to be advanced or delayed, and corrects the time data for advancing or delaying according to a result of determination.

8. A time control device according to claim 5 further comprising:

a dummy counter for periodically copying the time data stored in said time counter; and a correcting/checking unit for comparing the time data stored in said time counter to the time data stored in said dummy counter and generating an alarm indicating the defectiveness of said stepping control unit when the different between the two time data is larger than a specified value.

9. A time control device according to claim 8; wherein said time control device generates an alarm and stops the correction of internal time by said stepping control unit when said correcting/checking unit generates the alarm indicating defectiveness of said stepping control unit.

* * * * *